United States Patent
Burgess et al.

(10) Patent No.: US 11,759,818 B2
(45) Date of Patent: Sep. 19, 2023

(54) APPARATUS AND METHOD FOR COATING SUBSTRATES WITH WASHCOATS

(71) Applicant: Johnson Matthey Public Limited Company, London (GB)

(72) Inventors: Neil Burgess, Royston (GB); Christopher Hayton, Royston (GB); Craig Thomson, Royston (GB)

(*) Notice: Subject to any disclaimer, the term of this patent is extended or adjusted under 35 U.S.C. 154(b) by 0 days.

(21) Appl. No.: 17/811,661

(22) Filed: Jul. 11, 2022

(65) Prior Publication Data
US 2022/0339659 A1 Oct. 27, 2022

Related U.S. Application Data

(63) Continuation of application No. 17/247,298, filed on Dec. 7, 2020, now Pat. No. 11,420,224.

(30) Foreign Application Priority Data

Dec. 10, 2019 (EP) .................................... 19215030

(51) Int. Cl.
| | | |
|---|---|---|
| *B05C 5/02* | (2006.01) | |
| *B01J 37/02* | (2006.01) | |
| *B05D 1/02* | (2006.01) | |
| *B05D 1/26* | (2006.01) | |
| *B01D 53/94* | (2006.01) | |

(52) U.S. Cl.
CPC ......... *B05C 5/0225* (2013.01); *B01J 37/0215* (2013.01); *B05D 1/02* (2013.01); *B05D 1/26* (2013.01); *B01D 53/94* (2013.01); *B01D 2255/9155* (2013.01)

(58) Field of Classification Search
None
See application file for complete search history.

(56) References Cited

U.S. PATENT DOCUMENTS

| | | | |
|---|---|---|---|
| 4,609,563 | A | 9/1986 | Shimrock et al. |
| 5,422,138 | A | 6/1995 | Watanabe et al. |
| 6,599,570 | B1 | 7/2003 | Aderhold et al. |
| 6,627,257 | B1 | 9/2003 | Foerster et al. |

(Continued)

FOREIGN PATENT DOCUMENTS

| | | |
|---|---|---|
| CN | 103962265 A | 8/2014 |
| CN | 108027211 A | 5/2018 |

(Continued)

*Primary Examiner* — Alexander M Weddle

(57) ABSTRACT

The disclosure relates to a substrate coating apparatus that comprises a source of a washcoat; a washcoat showerhead for discharging the washcoat towards an upper surface of a substrate; a conduit fluidly connecting the source of the washcoat to the washcoat showerhead for supplying washcoat to the washcoat showerhead; a headset for engaging the substrate to locate the upper surface of the substrate below the washcoat showerhead; and a vacuum generator for drawing the washcoat discharged from the washcoat showerhead through the substrate. The headset comprises a partition comprising a plurality of holes, the partition being located in between the washcoat showerhead and the upper surface of the substrate when the substrate is engaged in the headset so as to maintain a first gap between a lower face of the partition and the upper surface of the substrate.

7 Claims, 10 Drawing Sheets
(4 of 10 Drawing Sheet(s) Filed in Color)

(56) References Cited

U.S. PATENT DOCUMENTS

| | | |
|---|---|---|
| 7,323,054 B2 | 1/2008 | Aderhold et al. |
| 2003/0075590 A1 | 4/2003 | Caspar et al. |
| 2007/0191217 A1 | 8/2007 | Twigg |
| 2008/0265520 A1 | 10/2008 | Kurth |
| 2009/0130294 A1 | 5/2009 | Fehnle et al. |
| 2010/0093527 A1* | 4/2010 | Hasselmann ........ B01J 37/0215 502/334 |
| 2016/0067720 A1 | 3/2016 | Nakano et al. |
| 2017/0284245 A1 | 10/2017 | Suzuki |
| 2018/0161806 A1 | 6/2018 | Rounce |
| 2018/0229228 A1 | 8/2018 | Arulraj et al. |

FOREIGN PATENT DOCUMENTS

| | | | |
|---|---|---|---|
| CN | 207563207 U | 7/2018 | |
| GB | 2524662 A * | 9/2015 | ............. B01D 37/02 |
| GB | 2524662 A | 9/2015 | |
| GB | 2 557 644 A | 6/2018 | |
| JP | 2018086615 A | 6/2018 | |
| WO | 9947260 A1 | 9/1999 | |
| WO | 2015145122 A2 | 10/2015 | |
| WO | 2016014407 A2 | 1/2016 | |
| WO | 2017178801 A1 | 10/2017 | |
| WO | 2017195107 A2 | 11/2017 | |

\* cited by examiner

APPARATUS AND METHOD FOR COATING SUBSTRATES WITH WASHCOATS

The present disclosure relates to apparatus and methods for coating substrates with washcoats. In particular, it relates to the coating of substrates used for purification of exhaust gases.

BACKGROUND TO THE DISCLOSURE

A substrate for purification of exhaust gases may typically comprise a monolithic substrate that is provided with passages for the through-flow of exhaust gases. The substrate may be provided with a coating, which may be a catalytic coating. The coating may be applied to the substrate as a washcoat that is passed through the passages of the substrate. Various methods for applying the coating to a substrate are known. One such method involves applying washcoat to a first face of the substrate (e.g. an upper face) and subjecting an opposite, second face (e.g. a lower face) of the substrate to at least a partial vacuum to achieve movement of the washcoat through the passages. After coating the substrate may be dried and calcined.

The substrate may be configured as a flow-through substrate wherein each passage is open at both the first and second faces of the substrate and the passage extends through the whole length of the substrate. Consequently, exhaust gases entering through a first face of the substrate into a passage pass through the substrate within the same passage until the exhaust gases exit a second face of the substrate. Alternatively, the substrate may be configured as a filter substrate, in which some passages are plugged at a first face of the substrate and other passages are plugged at a second face of the substrate. In such a configuration, exhaust gases entering through a first face of the substrate into a first passage flow along that first passage part-way along the substrate and then pass through a filtering wall of the substrate into a second passage. The exhaust gases then pass along said second passage and out of the second face of the substrate. Such an arrangement has become known in the art as a wall-flow filter.

The coated flow-through substrate may comprise a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), or a passive NOx adsorber (PNA).

The coated filter substrate may, for example, be a catalysed soot filter (CSF) comprising an oxidation catalyst, a selective catalytic reduction filter (SCRF) comprising a selective catalytic reduction (SCR) catalyst, a lean NOx trap filter (LNTF) comprising a NOx adsorber composition, a gasoline particulate filter (GPF) comprising a three-way catalyst composition, or a filter substrate comprising a selective catalytic reduction (SCR) catalyst and an ammonia slip catalyst (ASC).

The substrate may be made or composed of a ceramic material or a metallic material. For example, the substrate may be made or composed of aluminium titanate, cordierite ($SiO_2$-$Al_2O_3$-$MgO$), silicon carbide (SiC), Fe—Cr—Al alloy, Ni—Cr—Al alloy, or a stainless steel alloy.

The substrate will commonly have a substrate body which has a uniform cross-sectional shape along its longitudinal length. Typically, the substrate body may have a circular or near circular shape in cross-section, although other cross-sectional shapes are possible, for example square and rectangular. An upper surface of the substrate body may be defined as the face that is positioned uppermost during coating and likewise a lower surface of the substrate body may be defined as the face that is positioned lowermost during coating. Commonly, the upper face and lower face are planar and orthogonal to the longitudinal axis of the substrate body.

Some specialised substrates may be provided with a non-planar upper surface and or lower surface. For example, the upper surface may be provided with a groove or cut-out for receiving another component. For example a sensor of an emissions control system may be positioned in use in the groove or cut-out when the substrate is incorporated in an emissions control system. In another example, the upper surface may be concavely or convexly domed over a part or a whole of the face.

When coating substrates it may typically be desirable to achieve a substantially 'flat' washcoat profile—i.e. achieving a leading 'front' or 'edge' of the washcoat (marking the boundary interface between the coated and uncoated portions of the substrate) that is substantially flat or perpendicular to the longitudinal axis of the passages.

It has been found that applying washcoats to substrates having a non-planar upper surface or lower surface presents specific problems. Washcoat applied to the upper surface may preferentially collect or pool within a groove or cut-out. This can lead to difficulties in controlling precisely the distribution of the washcoat when drawn by vacuum into the substrate body, and in particular in achieving a substantially flat washcoat profile. For example, an uneven, i.e. non-flat, washcoat profile may be obtained in the substrate when the washcoat is subsequently pulled through the substrate. This may be caused, for example, by a greater volume of the washcoat overlying the groove or cut-out and so being drawn into the substrate body further in a region underlying the groove or cut-out. An uneven washcoat profile can result in a detrimental effect to the operational efficiency of the substrate. For example, uneven profiles may lead to portions of the substrate being uncoated (which reduces the catalytic efficiency of the substrate) or portions of the substrate being unintentionally coated more than once—where multiple doses of washcoat are applied (which can deleteriously increase the back pressure of the substrate). In some circumstances washcoat may be fully pulled through the substrate body and emerge from the lower surface. This can lead to waste of washcoat and also potentially blocking of the passage openings on the lower face of the substrate.

Alternatively or additionally, there may be a problem in adequately sealing the substrate body to prevent loss of washcoat down the sides of the substrate body. This can be a particular problem where the groove or cut-out extends to the sidewall of the substrate body. Soiling of the sidewall of the substrate with washcoat can also lead to visual degradation of the substrate and may obscure visual identification markings which may be provided on the sidewall of the substrate, e.g. tracing barcodes, etc.

Alternatively or additionally, there may be a problem in achieving even spreading of the washcoat over the upper surface of some substrates even though they have a planar upper surface. For example, it may be that for a given substrate there will be a threshold of viscosity below which the washcoat is absorbed too quickly into the passages and doesn't spread fully or equally across the upper surface. This may lead to increased amounts of washcoat entering the passages directly below the washcoat delivery outlet and hence lead to an uneven washcoat profile.

SUMMARY OF THE DISCLOSURE

In a first aspect the present disclosure provides a method of coating a substrate with a washcoat, wherein the method comprises the steps of:
  engaging the substrate with a headset of a substrate coating apparatus so as to locate an upper surface of the substrate below a washcoat showerhead of the substrate coating apparatus;
  arranging a partition between the washcoat showerhead and the upper surface of the substrate, the partition comprising a plurality of holes and being located in the headset to maintain a first gap between a lower face of the partition and the upper surface of the substrate;
  discharging a washcoat out of the washcoat showerhead onto an upper face of the partition; and
  passing the washcoat through the holes in the partition, onto the upper surface of the substrate and into the substrate, at least in part by applying a suction force to a lower surface of the substrate.

In a second aspect, the present disclosure provides a substrate coating apparatus comprising:
  a source of a washcoat;
  a washcoat showerhead for discharging the washcoat towards an upper surface of a substrate;
  a conduit fluidly connecting the source of the washcoat to the washcoat showerhead for supplying washcoat to the washcoat showerhead;
  a headset for engaging the substrate to locate the upper surface of the substrate below the washcoat showerhead; and
  a vacuum generator for drawing the washcoat discharged from the washcoat showerhead through the substrate;
  wherein the headset comprises a partition comprising a plurality of holes, the partition being located in between the washcoat showerhead and the upper surface of the substrate when the substrate is engaged in the headset so as to maintain a first gap between a lower face of the partition and the upper surface of the substrate.

In a third aspect, the present disclosure provides a substrate coating system comprising the substrate coating apparatus of the above aspect and a substrate, wherein the upper surface of the substrate is non-planar; and optionally wherein the upper surface of the substrate comprises a shaping, for example a groove or cut-out, which extends to the sidewall of the substrate thereby defining a gap in the sidewall.

In a fourth aspect, the present disclosure provides a partition configured for use in a substrate coating apparatus, the partition comprising a disc-shaped body;
  the disc-shaped body having a thickness between its upper face and its lower face of between 5 and 15 mm, optionally between 7.5 and 12.5 mm, optionally 10 mm;
  the partition comprising greater than 500 holes, optionally greater than 1000 holes, optionally greater than 1500 holes, optionally greater than 2000 holes;
  the holes each being between 1 to 3 mm in diameter, optionally 2 mm in diameter;
  wherein the percentage open area of the partition, defined as the percentage of the total area of the upper face of the partition that is comprised by the holes, is between 35 and 55%, optionally between 40 and 50%, optionally about 45%.

Advantageously, in any of the above aspects the use of the partition with its plurality of holes helps to prevent washcoat accumulating in, for example, a groove or cut-out of the upper surface of the substrate when the upper surface is non-planar. This has been found to result in a reduction in deleterious effects on the washcoat profile and a reduction of pull-through of washcoat out of the lower surface of the substrate.

In particular, in any of the above aspects advantageously the suction force may be applied within a certain time limit of the washcoat being discharged onto the upper face of the partition. For example, this time limit may be 5 seconds, preferably 3 seconds, more preferably 1 second. This may advantageously limit or prevent the washcoat reaching the upper surface of the substrate before the suction force is applied. In this way pooling or accumulation of the washcoat in any groove or cut-out in the upper surface may be prevented or at least substantially reduced since washcoat contacting the upper surface of the substrate may be immediately drawn into the substrate body by the applied suction force.

In addition, in any of the above aspects maintaining the first gap between the lower face of the partition and the upper surface of the substrate advantageously helps to minimise and or prevent bridging of the washcoat between the partition and the substrate before or after the suction force is applied to the lower surface of the substrate, by for example, preventing any capillary action between the partition and the upper surface of the substrate.

Any one of the first to fourth aspects may also comprise one or more of the following features:
  The partition may be arranged in a fixed relationship in the headset.
  The first gap may be between 2 and 7 mm, optionally 5 mm. Thus, the first gap may be optimised not only to minimise or prevent bridging of the washcoat but also to control and or limit further spreading of the washcoat. For example, the configuration of the washcoat showerhead may be chosen to achieve a desirable initial distribution of the washcoat onto the upper face of the partition. It may therefore be desirable not to have the first gap to be too large otherwise the washcoat may be subjected to further unwanted disturbance, e.g. from mixing of separate streams, splashing, bounce-back, etc. Therefore, a first gap of between 2 and 7 mm has been found most effective.
  The partition may be disc-shaped and have a thickness between its upper face and its lower face of between 5 and 15 mm, optionally between 7.5 and 12.5 mm, optionally 10 mm. It has been found advantageous to limit the thickness of the partition to between 5 and 15 mm so as to minimise the additional backpressure of the substrate coating system.
  The partition may be located in the headset to maintain a second gap between a lower face of the washcoat showerhead and the upper face of the partition of between 80 and 130 mm. A distance of between 80 and 130 mm has been found to optimise the distribution of the washcoat on the upper face of the partition when deposited by the washcoat showerhead.
  The partition may comprise greater than 500 holes, optionally greater than 1000 holes, optionally greater than 1500 holes, optionally greater than 2000 holes. The holes may each be between 1 to 3 mm in diameter, optionally 2 mm in diameter. The percentage open area of the partition, defined as the percentage of the total area of the upper face of the partition that is comprised by the holes, may be between 35 and 55%, optionally between 40 and 50%, optionally about 45%. Advantageously, the partition may thus be optimised to minimise or prevent seepage of the washcoat through the partition onto the upper surface of the substrate until the suction force is applied, while at the same time limiting the additional back pressure of the system and providing good distribution of the washcoat across the partition and hence across the upper surface of the substrate.

The headset may further comprise a headset seal and the partition may be arranged in the headset above the headset seal.

As noted, the upper surface of the substrate may be non-planar.

Additionally, the upper surface of the substrate may comprise a shaping, for example a groove or cut-out, which extends to the sidewall of the substrate thereby defining a gap in the sidewall.

The substrate may be selected from a flow-through substrate (e.g. a monolithic flow-through substrate) or a filter substrate (e.g. a wall-flow filter substrate).

The washcoat may comprise a catalytic coating. The catalytic coating may be selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

The washcoat may have a viscosity of 3 to 9000 cP.

In a fifth aspect, the present disclosure provides a method of coating a substrate with a washcoat, wherein the method comprises the steps of:
engaging the substrate with a headset of a substrate coating apparatus so as to locate an upper surface of the substrate below a washcoat showerhead of the substrate coating apparatus;
discharging a washcoat out of the washcoat showerhead towards the upper surface of the substrate;
drawing the washcoat through the substrate by applying a suction force to a lower surface of the substrate;
wherein the step of engaging the substrate with the headset comprises engaging a headset seal of the headset with the substrate, the headset seal comprising a perimetral portion extending around the headset and a cantilevered portion extending down from the perimetral portion which engages against a sidewall of the substrate.

In a sixth aspect, the present disclosure provides a substrate coating apparatus comprising:
a source of a washcoat;
a washcoat showerhead for discharging the washcoat towards an upper surface of a substrate;
a conduit fluidly connecting the source of the washcoat to the washcoat showerhead for supplying washcoat to the washcoat showerhead;
a headset for engaging the substrate to locate the upper surface of the substrate below the washcoat showerhead; and
a vacuum generator for drawing the washcoat discharged from the washcoat showerhead through the substrate;
wherein the headset comprises a headset seal for engaging against the substrate, the headset seal comprising a perimetral portion that extends around the headset and a cantilevered portion that extends down from the perimetral portion and which is configured to engage against a sidewall of the substrate.

In a seventh aspect, the present disclosure provides a headset seal for engaging against a substrate, the headset seal comprising a perimetral portion for extending around a headset and a cantilevered portion that extends from the perimetral portion and which is configured for engaging against a sidewall of a substrate.

Any one of the fifth to seventh aspects may also comprise one or more of the following features:
The perimetral portion may comprise an annular portion, optionally a circular or oval portion, that extends fully around the headset.
The cantilevered portion may be arc-shaped.
The cantilevered portion may have an arc length of between 105 and 300% of an arc length of the gap in the sidewall, optionally between 105 and 200% of an arc length of the gap in the sidewall.
The cantilevered portion may subtend a central angle of between 45 and 120°, optionally between 45 and 90°, optionally between 65 and 75°.
The cantilevered portion may extend at an angle of between 0 and 15° with respect to a plane perpendicular to the perimetral portion; optionally at an angle of between 0 and 10° with respect to a plane perpendicular to the perimetral portion; optionally at an angle of about 3° with respect to a plane perpendicular to the perimetral portion.
On engaging the substrate with the headset, the cantilevered portion of the headset seal may flex in a substantially radial direction.
A lower edge of the cantilevered portion may freely project and may thus be enabled to flex in a substantially radial direction.
The cantilevered portion may engage a region of the sidewall of the substrate having a height of at least 5 mm greater than a depth of a gap in the sidewall of the substrate.
The cantilevered portion may extend down at least 20 mm below a lower face of the perimetral portion, optionally at least 30 mm below a lower face of the perimetral portion, optionally at least 40 mm below a face rim of the perimetral portion.
The perimetral portion and the cantilevered portion may be formed unitarily or may be separate. The perimetral portion and the cantilevered portion may be formed of different materials.
At least the cantilevered portion may be formed from a flexible material.
The cantilevered portion may have a shore hardness of between 35 A and 45 A, optionally of 40 A.
The headset may comprise a rigid headset frame supporting the perimetral portion of the headset seal and the cantilevered portion of the headset seal may extend below a lower face of the rigid headset frame.
A lower edge of the cantilevered portion may freely project from the rigid headset frame.
The upper surface of the substrate may be non-planar.
The upper surface of the substrate may comprise a shaping, for example a groove or cut-out, which extends to the sidewall of the substrate thereby defining a gap in the sidewall, wherein the cantilevered portion bridges over the gap to hinder leakage of the washcoat out of the gap and down the sidewall of the substrate.
The substrate may be selected from a flow-through substrate (e.g. a monolithic flow-through substrate) or a filter substrate (e.g. a wall-flow filter substrate).
The washcoat may comprise a catalytic coating. The catalytic coating may be selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

The features of the first to fourth aspects may be combined with features of the fifth to seventh aspects and vice versa. For example, a substrate coating apparatus may be provided with a partition according to the second aspect and a headset seal according to the sixth aspect.

In the present specification all references to viscosity refer to the viscosity of the fluid as measured using a Brookfield Rotational Viscometer fitted with a Small Sample Adaptor and link hanging spindle with the sample temperature controlled at 25° C. Such viscometers are available from Brookfield Engineering Laboratories, Inc., Middleboro, MA, USA.

All measurements were taken at a shear rate of 14 $s^{-1}$. As will be common general knowledge to the skilled person, the spindle, rotational speed and viscometer model were chosen in dependence on the viscosity of the fluid in order to ensure the % viscometer torque has a minimum measurement greater than 10% and a maximum measurement less than 100%, where this is not possible the % viscometer torque may have a minimum measurement greater than 0% and a maximum measurement of less than 100%. For the viscosity measurements in the present specification the following spindles were used:

Viscosity range 3 to 100 cP was measured using spindle SC4-18 at 10.6 rpm on an LV viscometer.

Viscosity range 100 to 500 cP was measured using spindle SC4-28 at 50 rpm on an LV viscometer.

Viscosity range 500 to 9000 cP was measured using spindle SC4-28 at 50 rpm on an RV viscometer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects and embodiments of the present disclosure will now be described, by way of example only, with reference to the accompanying drawings, in which.

DETAILED DESCRIPTION

As used in this specification and the appended claims, the singular forms "a", "an" and "the" include plural referents unless the context clearly indicates otherwise. Thus, for example, reference to a "catalyst" includes a mixture of two or more catalysts, and the like.

As used in this specification the term "about" also includes the specific value. For example, "about 45%" includes about 45% and also 45% within its meaning.

The skilled reader will recognise that one or more features of one aspect or embodiment of the present disclosure may be combined with one or more features of any other aspect or embodiment of the present disclosure unless the immediate context teaches otherwise.

Figure 1:
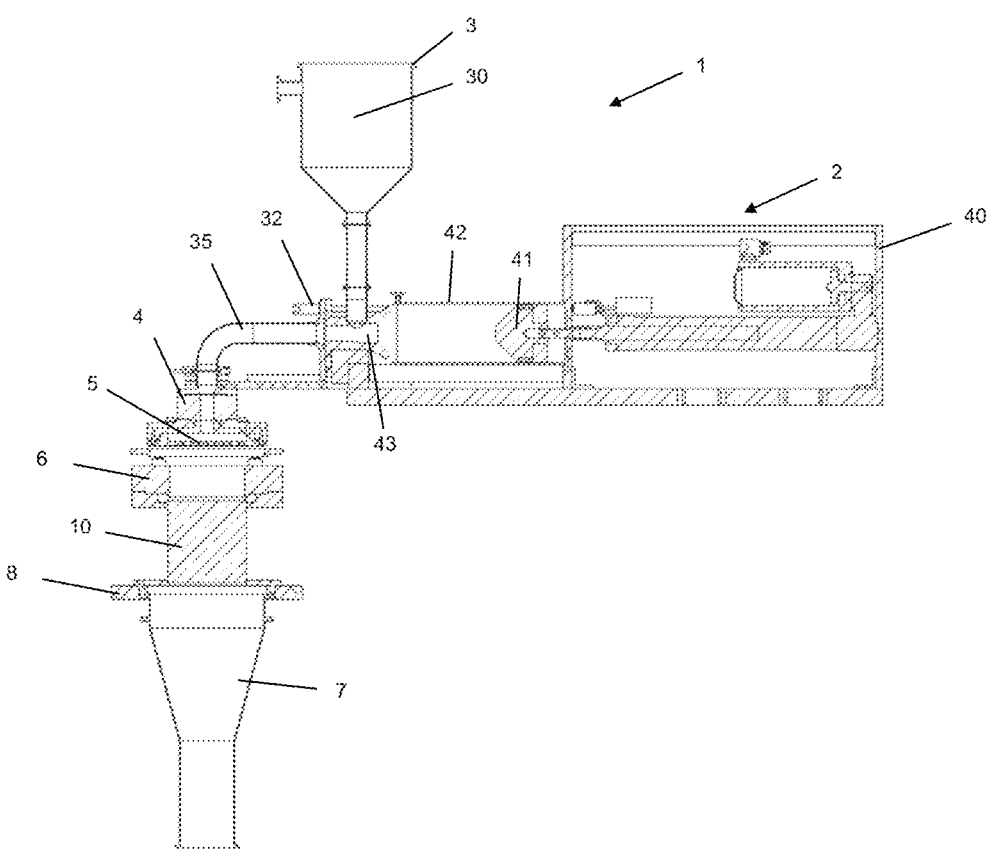
FIG. 1 is a schematic cross-sectional view of a substrate coating apparatus.

FIG. 1 shows a schematic cross-sectional view of a non-limiting example of a substrate coating apparatus 1 that may be used for coating a substrate 10 with a washcoat.

The substrate coating apparatus 1 may comprise a depositor 2 having a housing 40 containing apparatus for activating a dispensing mechanism. As shown, the dispensing mechanism may comprise a piston 41 which is axially moveable within a bore 42 to displace a fluid out of an outlet 43 towards a conduit 35 located downstream of the depositor 2.

The substrate coating apparatus 1 may further comprises a hopper 3 defining a hopper reservoir 30 having an outlet 31 connecting with the outlet 43 of the depositor 2 via a diaphragm valve 32. The hopper 3 may be filled with a washcoat that has been formulated and pre-mixed at another location. The washcoat may be pumped into the hopper reservoir 30 or may be fed under gravity into the hopper reservoir 30 through suitable conduits.

The outlet 43 of the depositor 2 fluidly connects with the conduit 35 which in turn may extend into fluid communication with a dosing valve 4. A washcoat showerhead 5 may be connected to a lower face of the dosing valve 4 with the washcoat showerhead 5 being positioned above the substrate 10.

The substrate 10 may be located and positioned between a headset 6 and a pallet insert 8. A vacuum apparatus including a vacuum cone 7 may be located beneath the substrate 10.

Figure 2:
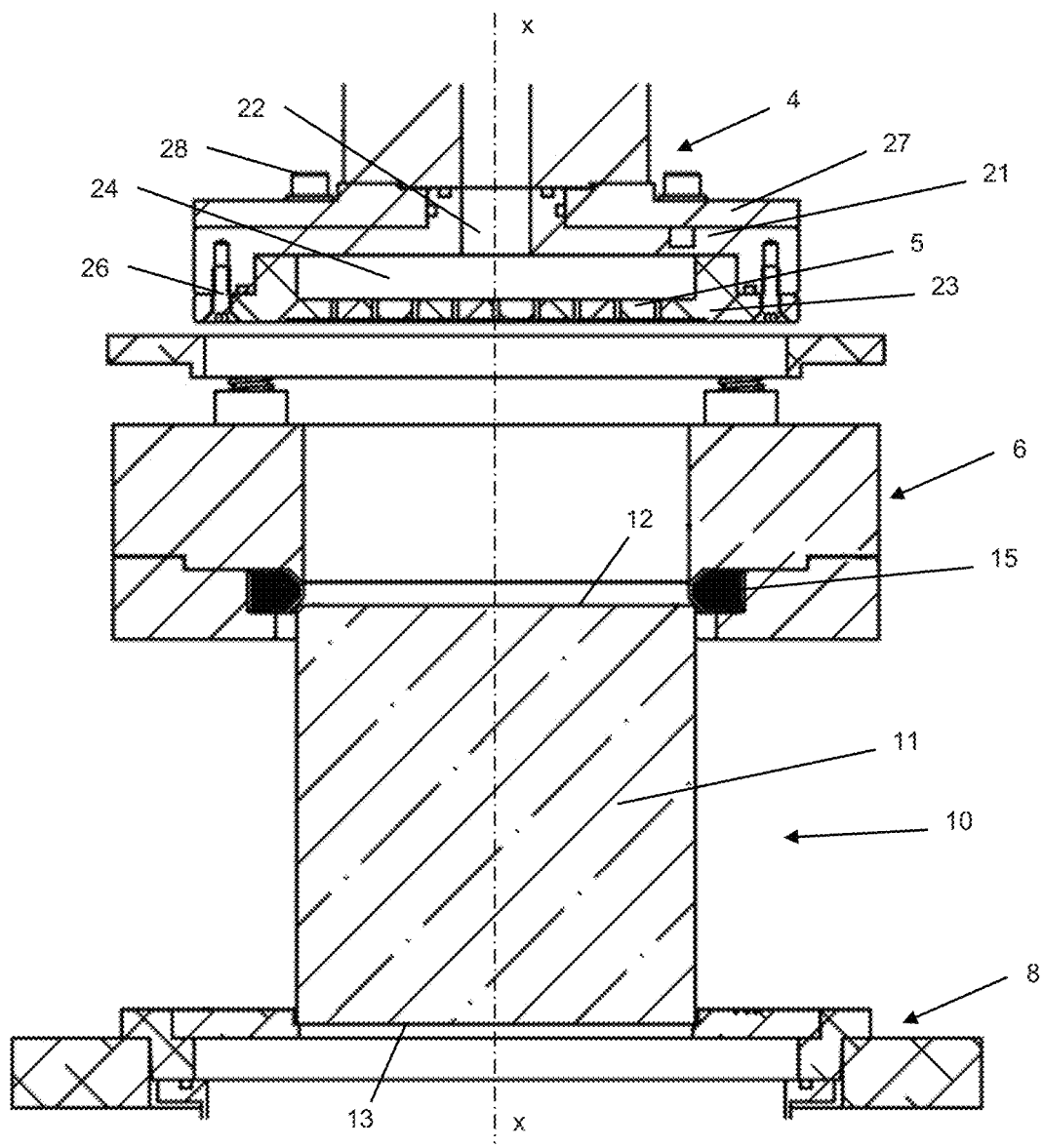
FIG. 2 is a schematic enlarged view of a portion of FIG. 1.

FIG. 2 shows an enlarged portion of the substrate coating apparatus 1 of FIG. 1 and shows in more detail how the substrate 10 may be positioned relative to the washcoat showerhead 5 and headset 6.

FIGS. 1 and 2 show the substrate 10 to be of a of the type that has a substrate body 11 which has a uniform cross-sectional shape along its longitudinal length. Typically, the substrate body 11 may have a circular or near circular shape in cross-section. The substrate body 11 may be positioned to extend between the headset 6 and the pallet insert 8 such that an upper surface 12 of the substrate body 11 is uppermost and a lower surface 13 of the substrate body 11 is lowermost. The upper surface 12 and lower surface 13 are planar and orthogonal to the longitudinal axis of the substrate body 11.

The headset 6 may comprise a headset seal 15 that engages an upper edge circumscribing the upper surface 12 of the substrate body 11. The headset seal 15 may comprise an annular ring that extends fully around the headset 6.

The washcoat showerhead 5 may be located above the headset 6 and may be preferably aligned with the headset 6 and substrate 10 such that a central longitudinal axis, x, of the washcoat showerhead 5 is coincident with the central longitudinal axis of both the headset 6 and substrate body 11 as shown in FIG. 2.

The washcoat showerhead 5 may comprise a showerhead housing 21 to which may be coupled, on a lower side, a showerhead plate 23 by means of bolts 26. An adaptor plate 27 may be coupled to an upper side of the showerhead housing 21, also by means of bolts 28.

The showerhead housing 21 may comprise a centrally located aperture defining an inlet 22 to a showerhead cavity 24 that is defined between the showerhead housing 21 and the showerhead plate 23. The axis of the inlet 22 may be coincident with longitudinal axis x. The adaptor plate 27 may also comprise a centrally located aperture, which may be coincident with longitudinal axis x, and sized to receive a central portion 20 of the showerhead housing 21. The dosing valve 4 may be brought into, and held in, fluid communication with the inlet 22 of the showerhead housing 21.

The showerhead plate 23 may be provided with an array of nozzle apertures 25.

In use, diaphragm valve 32 is opened and washcoat is drawn into the bore 42 from the hopper reservoir 30 by movement of the piston to the right (as viewed in FIG. 1). The diaphragm valve 32 is then shut and the dose of washcoat is then displaced through conduit 35 by action of the piston 41 of the depositor 2 moving to the left (as viewed in FIG. 1). The washcoat passes through the dosing valve 4 and inlet 22 into the showerhead cavity 24. The washcoat then passes through the nozzle apertures 25 and drops down into contact with the upper surface 12 of the substrate 10. The washcoat is then drawn down through the passages of the substrate 10. Drawing of the washcoat through the substrate 10 is driven, at least in part, by a suction force applied to the lower surface 13 of the substrate 10 by the vacuum cone 7.

Figure 3:
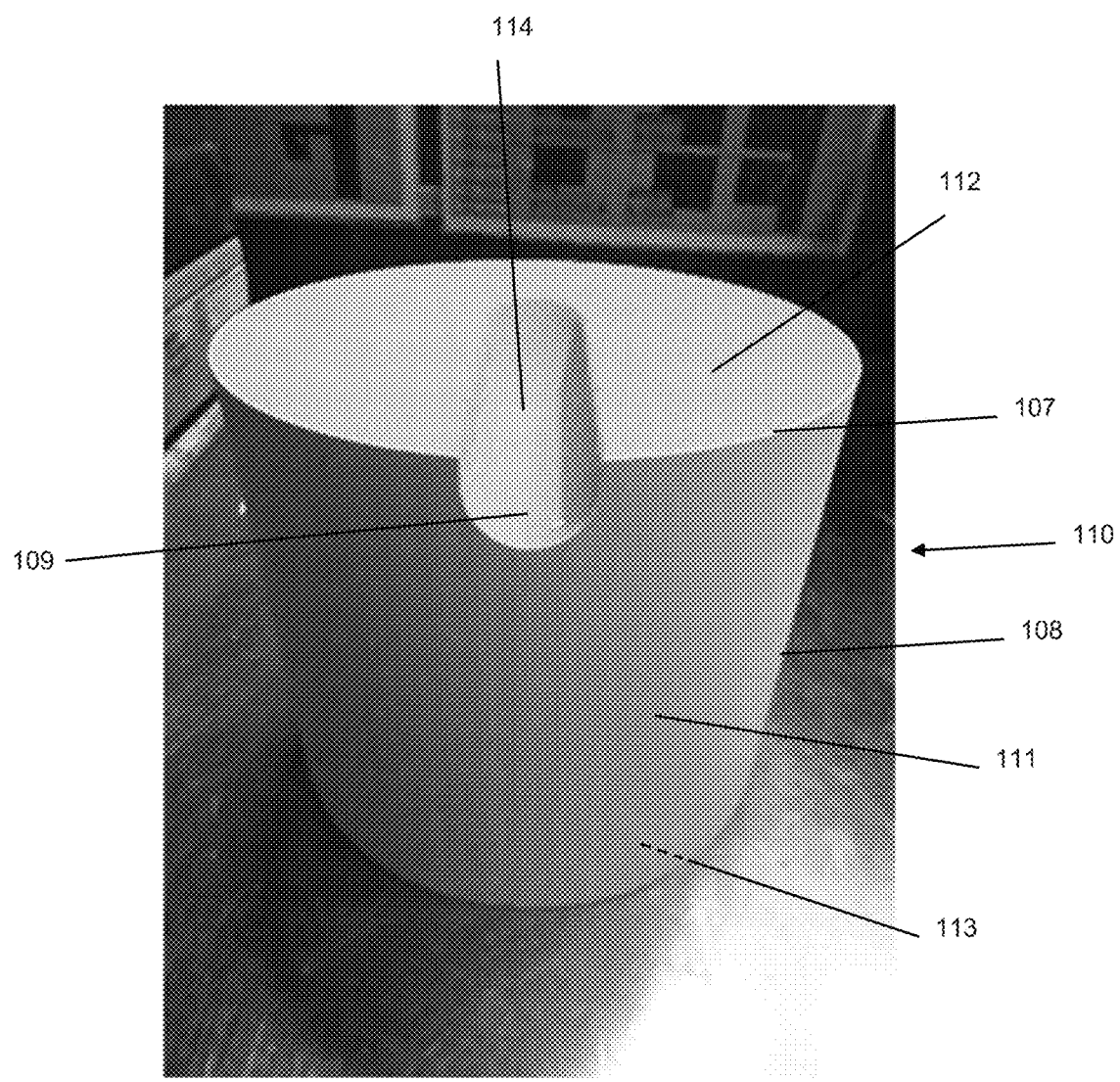
FIG. 3 is a perspective view of a substrate.

FIG. 3 shows a substrate 110 which has a substrate body 111 with an upper surface 112, a lower surface 113 and a sidewall 108. An upper edge 107 extends around the upper surface 112. The illustrated substrate 110 is generally cylindrical in shape with a single, cylindrical sidewall 108. However, the substrate 110 may take other forms, such as having an oval, square or rectangular upper surface with one or more, e.g. four, sidewalls.

The upper surface 112 is provided with a groove or cut-out 114, hereinafter called for simplicity "groove 114". The groove 114 may take many shapes or forms and be of various lengths. The groove 114 may be shaped and sized to fully or partly receive another component, for example a sensor of an emissions control system.

The groove 114 results in the upper surface 112 being non-planar. The groove 114 may extend across the full diameter of the upper surface 112. Alternatively, as shown in FIG. 3, the groove 114 may extend across part of the diameter of the upper surface 112. The groove 114 may extend at one or both of its ends to the sidewall 108 so as to define one or more gaps 109 in the sidewall 108 and one or more breaks in the upper edge 107. As shown in FIG. 3, a single gap 109 is provided.

The groove 114 may have various cross-sectional shaped when sectioned perpendicular to its length. The groove 114 of FIG. 3 has a semi-circular cross-sectional shape. However, other shapes may be used dependent on the shape of the component to be accommodated by the groove 114. The gap 109 may have substantially the same shape as the shape of the groove 114.

Figure 4:
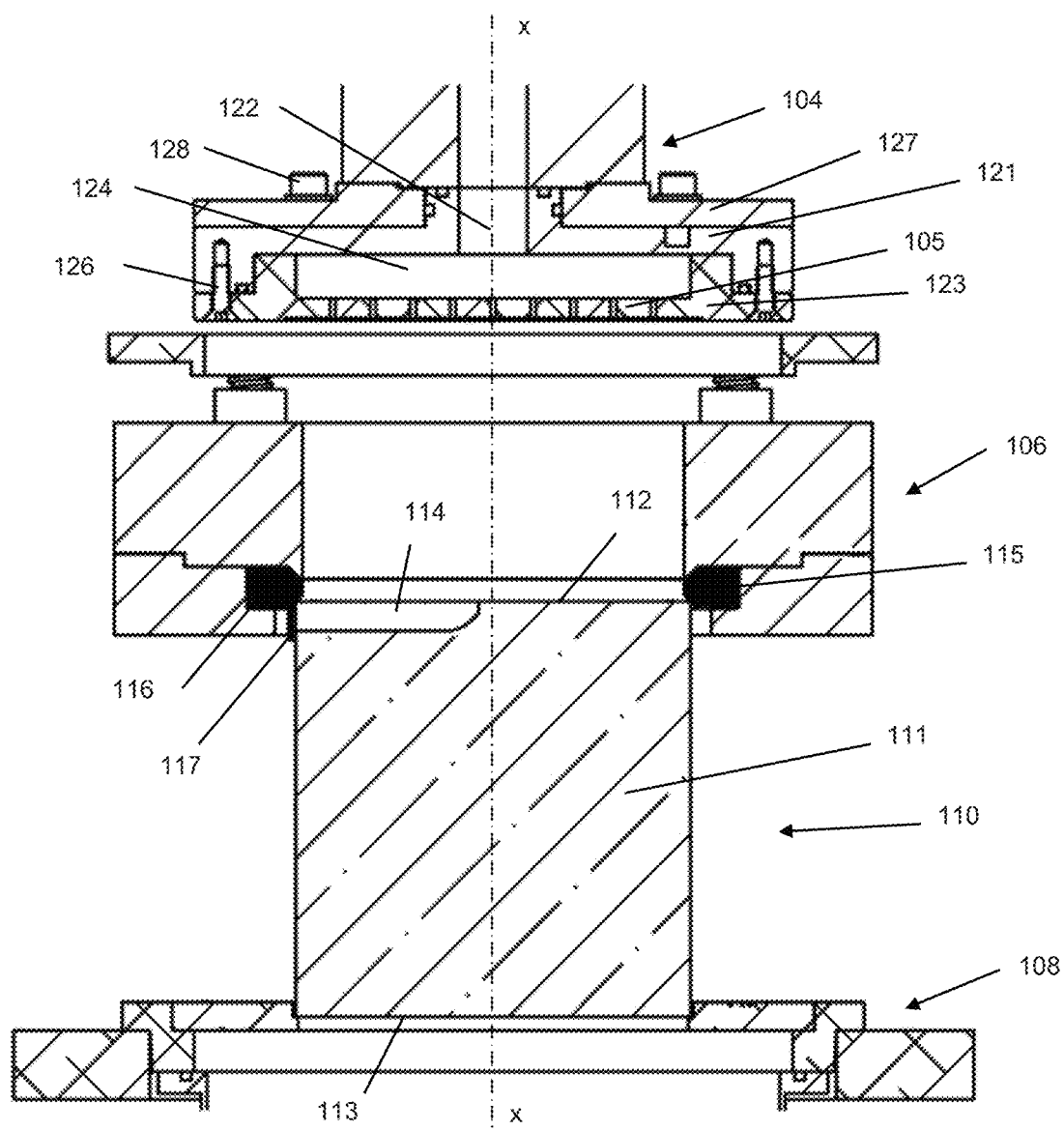
FIG. 4 is a schematic view showing a substrate of the type shown in FIG. 3 in a portion of a substrate coating apparatus.
Figure 5:
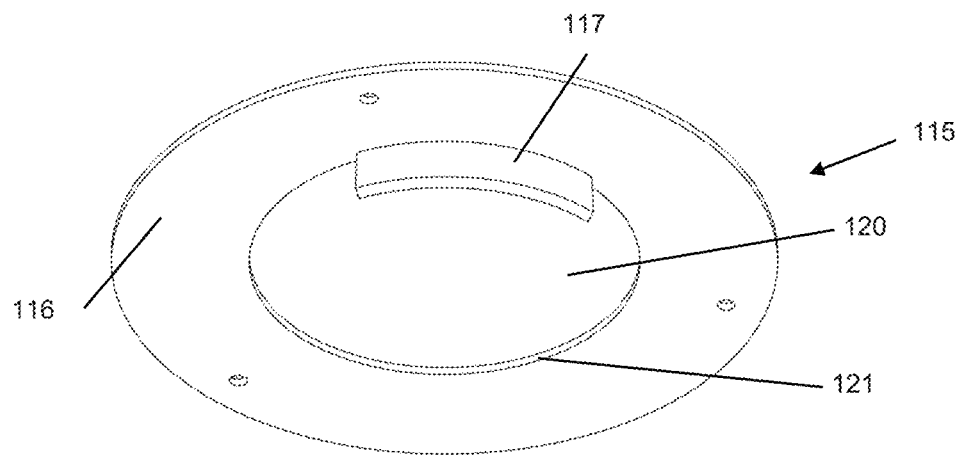
FIG. 5 is a perspective view from underneath of a headset seal for a substrate coating apparatus.

FIG. 4 illustrates certain aspects of the present disclosure wherein a portion of the substrate coating apparatus 100 according to the present disclosure which is modified compared to the substrate coating apparatus 1 to allow it to advantageously coat substrates that have non-planar upper surfaces and or lower surfaces. The substrate coating apparatus 100 will be described, by way of example only, for coating the substrate 110 of FIG. 3. However, it will be appreciated that this is not limiting and the substrate coating apparatus 100 may be used beneficially for the coating of other substrates.

Features of the substrate coating apparatus 100 that are the same or substantially the same as the substrate coating apparatus 1 of FIGS. 1 and 2 have been referenced with similar reference numerals, e.g. 1 and 101, 10 and 110, and will not be described in further detail. Reference should be made to the above description.

However, the headset seal 115 of the substrate coating apparatus 101 is different to the headset seal 15 of the substrate coating apparatus 1 shown in FIG. 2.

In particular, as shown in FIGS. 5 to 8, the headset seal 115 comprises a perimetral portion 116 for extending around the headset 106 and a cantilevered portion 117 that extends from the perimetral portion 116 and which is configured for engaging against the sidewall 108 of the substrate 110.

Figure 6:
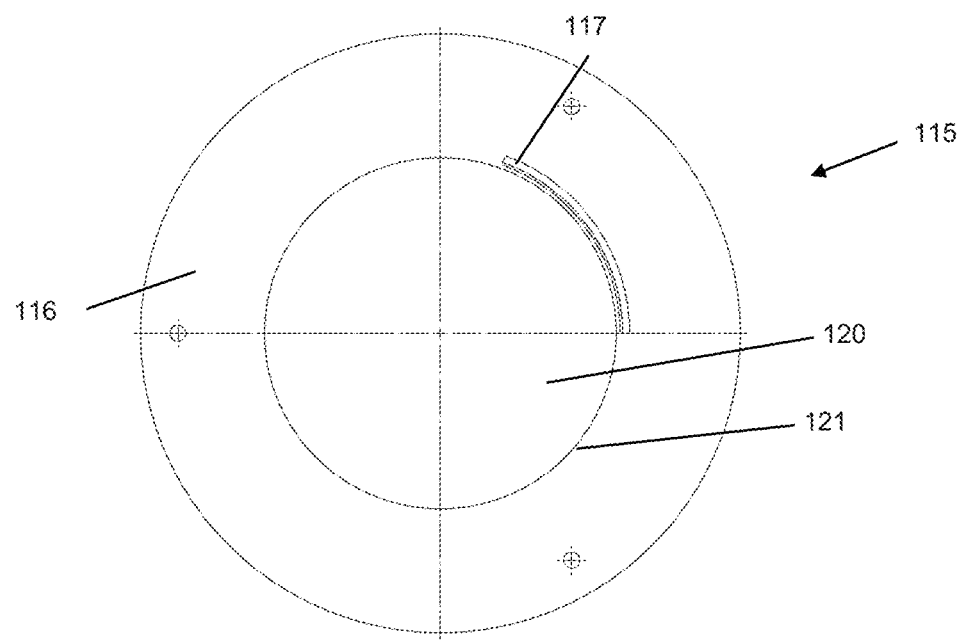
FIG. 6 is a plan view from underneath of the headset seal of FIG. 5.
Figure 7:
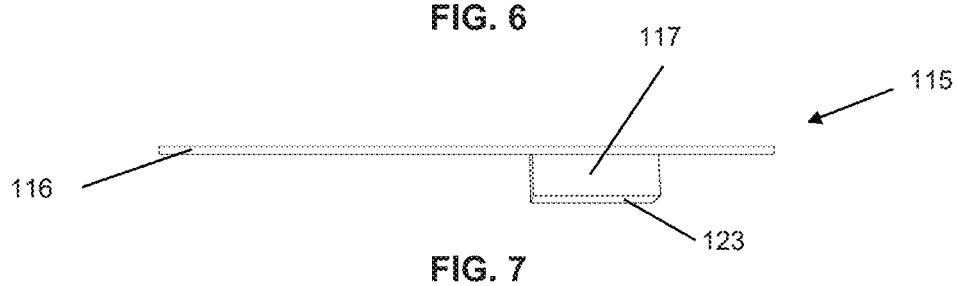
FIG. 7 is a side elevation view of the headset seal of FIG. 5.

As shown in FIGS. 6 and 7, the perimetral portion preferably comprises an annular portion, which may be circular or oval in shape, that extends fully around the headset 106 when mounted therein. The perimetral portion 116 may define a central aperture 120 surrounded by an inner edge 121. The inner edge 121 may be perpendicular to the faces of the perimetral portion 116. Alternatively, the inner edge 121 may be provided with a shoulder, chamfer or taper as desired.

The cantilevered portion 117 may be located at or in proximity to the inner edge 121 of the perimetral portion 116. The cantilevered portion 117 may be arc-shaped. This may be particularly beneficial where the sidewall 108 of the substrate 110 is cylindrical. The cantilevered portion 117 may subtend a central angle of between 45 and 120°, optionally between 45 and 90°, optionally between 65 and 75°. The cantilevered portion 117 may alternatively or additionally have an arc length of between 105 and 300% of an arc length of the gap 109 in the sidewall 108, optionally between 105 and 200% of an arc length of the gap 109 in the sidewall 108.

The cantilevered portion 117 may extend down at least 20 mm below a lower face of the perimetral portion 116, optionally at least 30 mm below a lower face of the perimetral portion 116, optionally at least 40 mm below a face rim of the perimetral portion 116.

Figure 8:
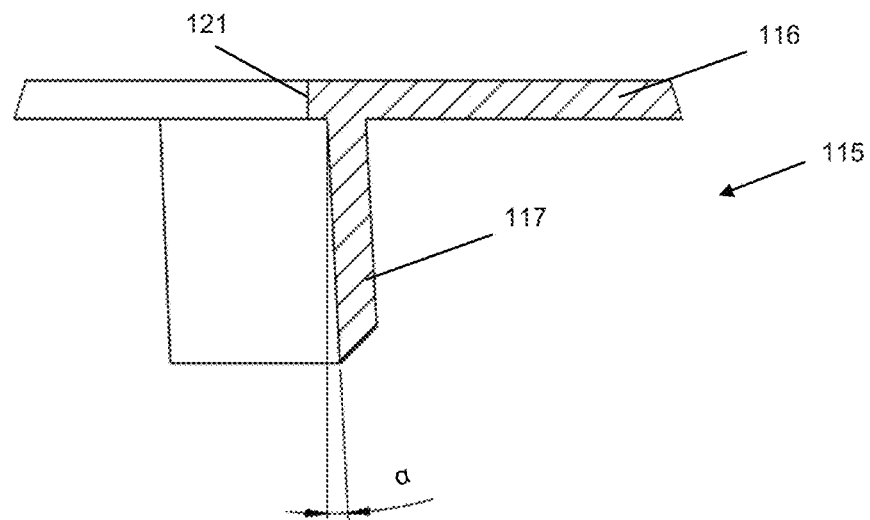
FIG. 8 is a cross-sectional view of the headset seal of FIG. 5.

As viewed in FIGS. 6 and 8, the cantilevered portion 117 may have a depth, in a radial direction, of between 2.5 to 5.0 mm.

As shown most clearly in FIG. 8, the cantilevered portion 117 may extend at an angle α of between 0 and 15° with respect to a plane perpendicular to the perimetral portion 116; optionally at an angle α of between 0 and 10° with respect to a plane perpendicular to the perimetral portion 116; optionally at an angle α of about 3° with respect to a plane perpendicular to the perimetral portion 116.

The perimetral portion 116 and the cantilevered portion 117 are preferably formed unitarily, although they may be formed separately and then mounted together within the headset 106.

The perimetral portion 116 and the cantilevered portion 117 may be formed of different materials, for example differently co-moulded materials. However, it may be preferred that they are formed from a single material.

At least the cantilevered portion 117 may be formed from a flexible material. The perimetral portion 116 and or the cantilevered portion 117 may be formed from material having a shore hardness of between 35 A and 45 A, optionally of 40 A. The perimetral portion 116 and or the cantilevered portion 117 may be formed from a rubber, an elastomer, or other sealing material. Non-limiting examples of suitable materials are silicone rubber and EPDM, for example silicone rubber 40 shore hard and EPDM 40 shore hard.

Figure 9:
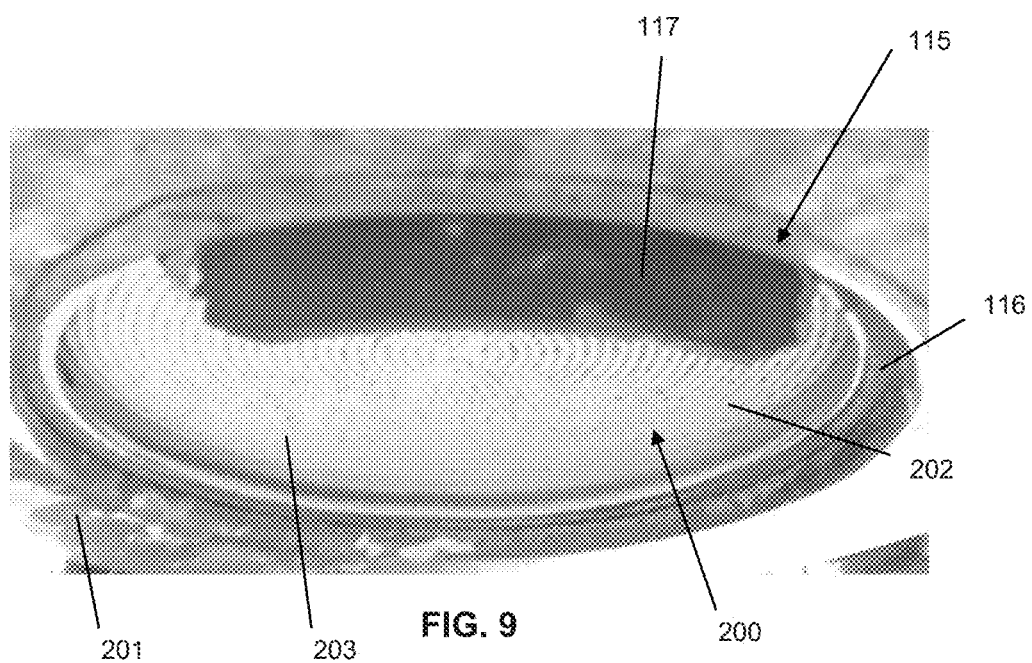
FIG. 9 is a photograph of a portion of a substrate coating apparatus incorporating a headset seal of the type shown in FIG. 5.

As shown in FIG. 4, the headset seal 115 is mounted in the headset 106. The perimetral portion 116 may extend fully around the perimeter of the headset 106. The cantilevered portion 117 is shown extending down from the perimetral portion 116. A lower edge 123 of the cantilevered portion 117 may freely project from the frame of the headset and thus be enabled to flex in a substantially radial direction as shown most clearly in the photograph of FIG. 9 (FIG. 9 also illustrates features of a partition 200 which will be described further below).

On engaging the substrate 110 with the headset 106—wherein the substrate 110 may be lifted into engagement with the headset 106—the cantilevered portion 117 of the headset seal 115 may flex in a substantially radial direction to accommodate passage of the substrate 110. The flexibility of the cantilevered portion 117 and limited arc length of the cantilevered portion 117 may both aid easier and more reliable engagement of the substrate 110 with the headset 106 during lifting of the substrate. Thus, some tolerance for lateral misalignment of the substrate 110 with the headset 106 can be tolerated and adjusted for by flexing of the cantilevered portion 117.

Additionally or alternatively, the angling of the cantilevered portion 117 at an angle α of between 0 and 15° with respect to a plane perpendicular to the perimetral portion 116 may also aid easier and more reliable engagement of the substrate 110 with the headset 106 during lifting of the substrate. Thus, some tolerance for lateral misalignment of the substrate 110 with the headset 106 can be tolerated and adjusted for by the angling of the cantilevered portion 117.

In FIG. 4, a substrate 110 with a groove 114 is shown engaged in the headset 106. The perimetral portion 116 may engage sealingly against the upper edge 107 of the substrate 110. This engagement may be with the inner edge 121 of the perimetral portion 116.

The cantilevered portion 117 may engage a region of the sidewall 108 of the substrate 110. As shown in FIG. 4, preferably, the cantilevered portion 117 bridges over the gap 109 to hinder leakage of the washcoat out of the gap 109 and down the sidewall 108 of the substrate. The cantilevered portion 117 may have a height of at least 5 mm greater than a depth of the gap 109 in the sidewall 108 of the substrate 110.

As noted above, the cantilevered portion 117 may have an arc length of between 105 and 300% of an arc length of the gap 109 in the sidewall 108, optionally between 105 and 200% of an arc length of the gap 109 in the sidewall 108. In this way tolerance for some angular misalignment of the substrate 110 may be achieved, i.e. since the cantilevered portion 117 will still be long enough to bridge over and fully seal the gap 109.

During operation of the substrate coating apparatus 101, a suction force is applied to the lower surface of the substrate 110 using the vacuum cone. Advantageously, the flexibility and or relative thinness of the cantilevered portion 117 permits the cantilevered portion to be 'sucked' into firmer engagement with the sidewall 108 by the suction force. This increase the reliability of the seal between the cantilevered portion 117 and the substrate 110.

During operation of the apparatus shown in FIG. 4, as with the substrate coating apparatus 1, the washcoat passes through the dosing valve 104 and inlet 122 into the showerhead cavity 124. The washcoat then passes through the nozzle apertures 125 and drops down into contact with the upper surface 112 of the substrate 110. The washcoat is then drawn down through the passages of the substrate 110. Drawing of the washcoat through the substrate 110 is driven, at least in part, by a suction force applied to the lower surface 113 of the substrate 110 by the vacuum cone 7. During this process some washcoat may accumulate or pool in the groove 114. Washcoat may run along groove 114. However, the seal provided by the cantilevered portion 117 over the gap 109 prevents or substantially reduces any leakage of washcoat out of the gap 109 and down the sidewall 108.

Figure 10:
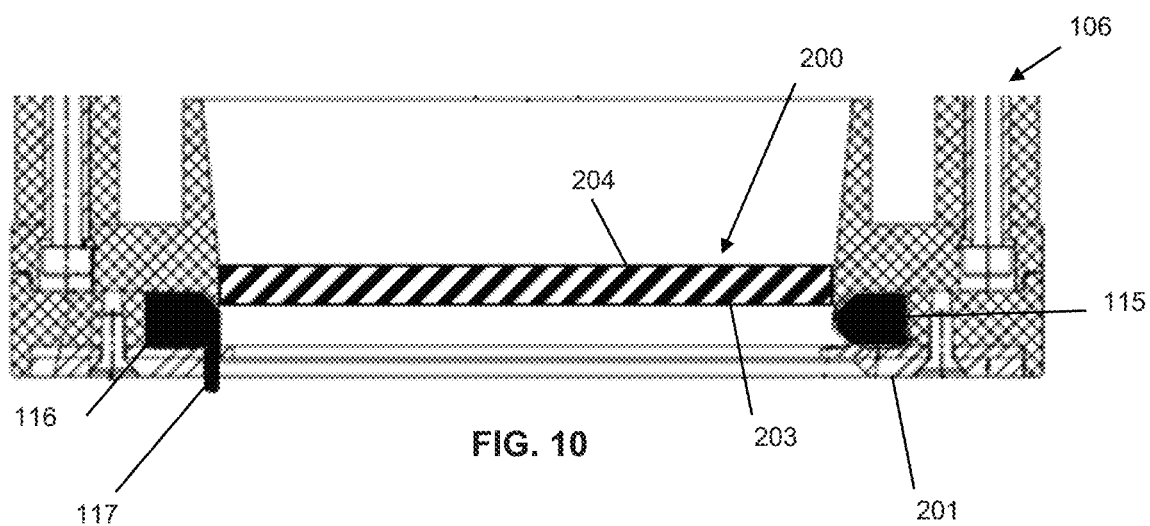
FIG. 10 is a cross-sectional view of a portion of a substrate coating apparatus that incorporates a partition.

FIG. 10 illustrates certain aspects of the present disclosure wherein a substrate coating apparatus is provided with a partition 200 interposed between the washcoat showerhead and an upper surface of the substrate. The partition 200 will be described in the following as part of the substrate coating apparatus 101 shown in FIGS. 4 to 9 by way of example only. The partition 200 may be used in other substrate coating apparatus. However, particularly beneficial effects may be achieved when using the partition 200 in combination with a headset seal 115 having a cantilevered portion 117 as just described.

Figure 11:
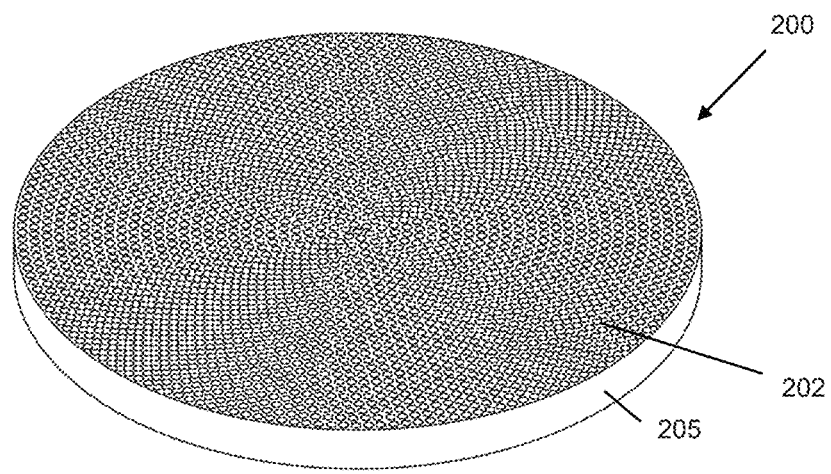
FIG. 11 is a perspective view from above of the partition of FIG. 10.
Figure 12:
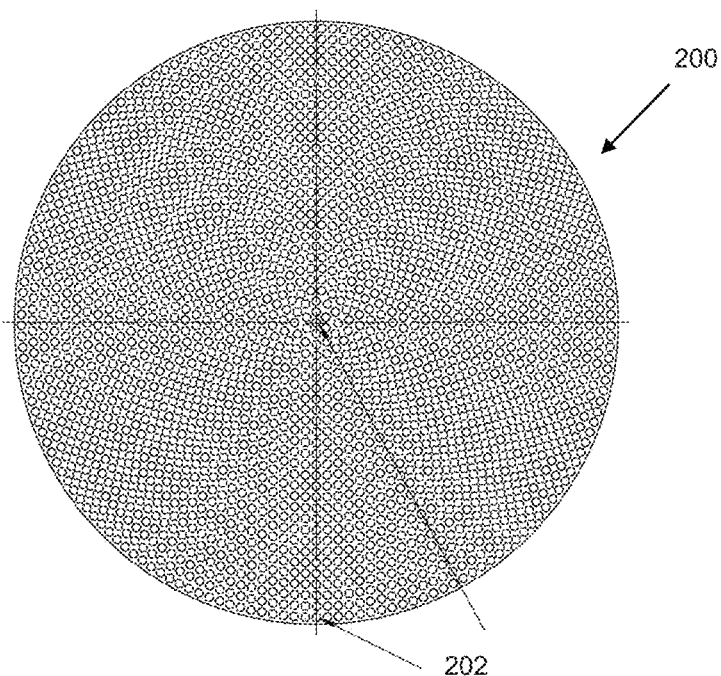
FIG. 12 is a plan view from above of the partition of FIG. 10.
Figure 13:
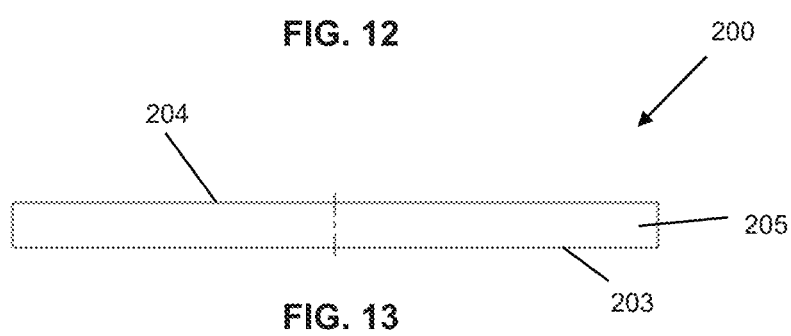
FIG. 13 is a side elevation view of the partition of FIG. 10.

As shown most clearly in FIGS. 11 to 13, the partition 200 comprises a body 205 comprising a plurality of holes 202. The body 205 may be disc-shaped and may have an upper face 204 and a lower face 203. The body 205 of FIG. 12 is circular in shape. However, the partition 200 may be other shapes and may be adapted to fit the size and shape of a particular headset.

The partition 200 may have a thickness between the upper face 204 and the lower face 203 of between 5 and 15 mm, optionally between 7.5 and 12.5 mm, optionally 10 mm.

The partition 200 may comprise greater than 500 holes 202, optionally greater than 1000 holes 202, optionally greater than 1500 holes 202, optionally greater than 2000 holes 202. The holes 202 may each be between 1 to 3 mm in diameter, optionally 2 mm in diameter. The holes 202 may be arranged in a regular pattern or may be arranged stochastically.

The percentage open area of the partition 200, defined as the percentage of the total area of the upper face 204 of the partition 200 that is comprised by the holes 202, may be between 35 and 55%, optionally between 40 and 50%, optionally about 45%.

The partition 200 may be located in between the washcoat showerhead 105 and the upper surface 112 of the substrate 110 when the substrate 110 is engaged in the headset 106 so as to maintain a first gap between the lower face 203 of the partition 200 and the upper surface 112 of the substrate 110. The first gap may be between 2 and 7 mm, optionally 5 mm.

Additionally or alternatively, the partition 200 may be located in the headset 106 to maintain a second gap between a lower face of the washcoat showerhead 105 and the upper face 204 of the partition. The second gap may be between 80 and 130 mm.

Preferably, the partition 200 is fixedly located in the headset 106 so as to be held stationary relative to a housing of the headset 106.

The partition 200 may be formed from a metal, a plastic or other rigid material. Non-limiting examples of suitable materials include polyvinyl chloride (PVC), Acetal, Nylon 66 and Accura 25.

As shown in FIG. 10, preferably the partition 200 is arranged in the headset 106 above the headset seal 115.

In use, the substrate coating apparatus 101 incorporating the partition 200 may be used in a method of coating a substrate 110 with a washcoat, wherein the method comprises the steps of:
- engaging the substrate 110 with the headset 106 so as to locate the upper surface 112 of the substrate 110 below the washcoat showerhead 105 of the substrate coating apparatus 101;
- arranging the partition 200 between the washcoat showerhead 105 and the upper surface 112 of the substrate 110, the partition 200 being located in the headset 106 to maintain the first gap between the lower face 203 of the partition 200 and the upper surface 112 of the substrate 110;
- discharging a washcoat out of the washcoat showerhead 105 onto the upper face 204 of the partition 200; and
- passing the washcoat through the holes 202 in the partition 200, onto the upper surface 112 of the substrate 110 and into the substrate 110, at least in part by applying a suction force to the lower surface 113 of the substrate 110.

EXAMPLES

Figure 14:
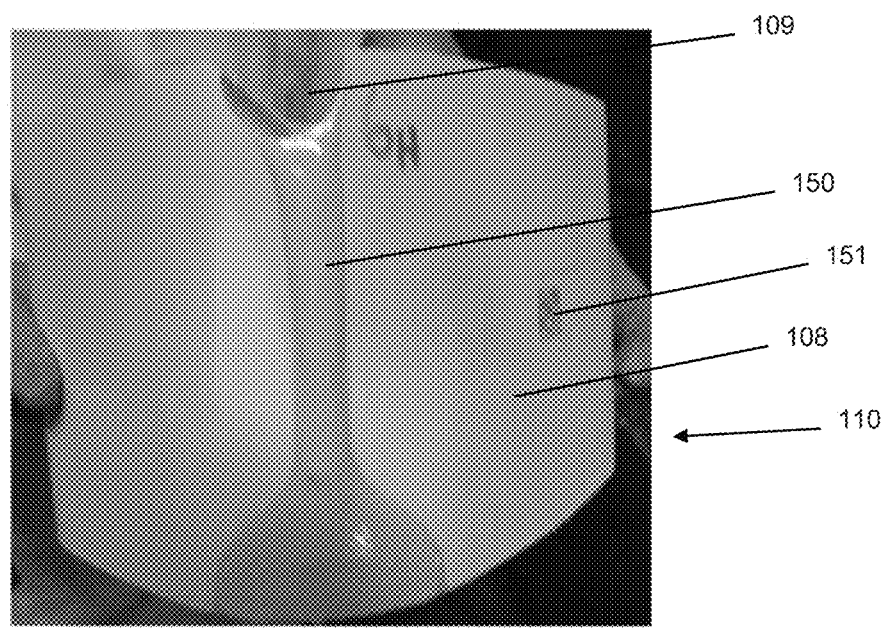
FIG. 14 is a side view of a substrate after coating with a washcoat.

FIG. 14 shows a side view of a substrate 110 that has had a washcoat applied to it using a substrate coating apparatus 1 of the type shown in FIGS. 1 and 2, i.e. without use of the headset seal 115 or the partition 200 according to the present disclosure. As can be seen, during coating the washcoat 150 has leaked out of the gap 109 at the end of the groove 114 in the substrate and down the sidewall 108 of the substrate 110. Such leakage has resulted in this case in wastage of washcoat, soiling of the sidewall 108 of the substrate 110 and could also lead to obscuring of the visual identification markings 151 which may be provided on the sidewall 108 of the substrate.

Figure 15:
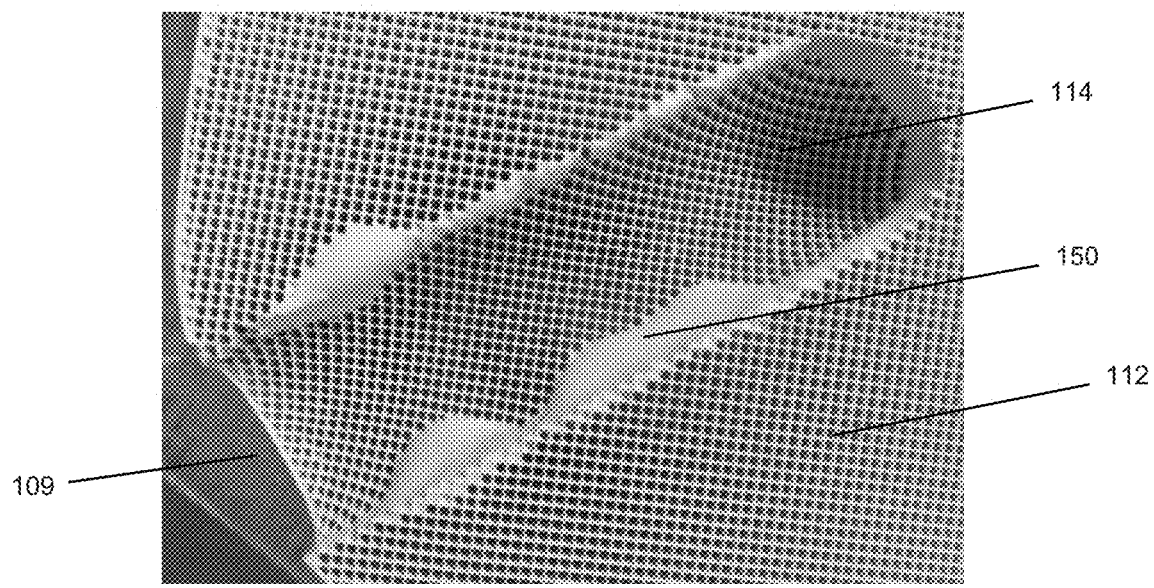
FIG. 15 is a top plan view of a portion of a substrate after coating with a washcoat.

FIG. 15 shows a top plan view of a substrate 110 that has had a washcoat applied to it using a substrate coating apparatus 1 of the type shown in FIGS. 1 and 2, i.e. without use of the headset seal 115 or the partition 200 according to the present disclosure. As can be seen, during coating excess washcoat 150 has accumulated in portions of the groove 114 which has not been adequately drawn into the passages by the vacuum. This can result in wastage of washcoat and blocking of some of the passages—resulting in an increased back pressure in use.

Figure 16:
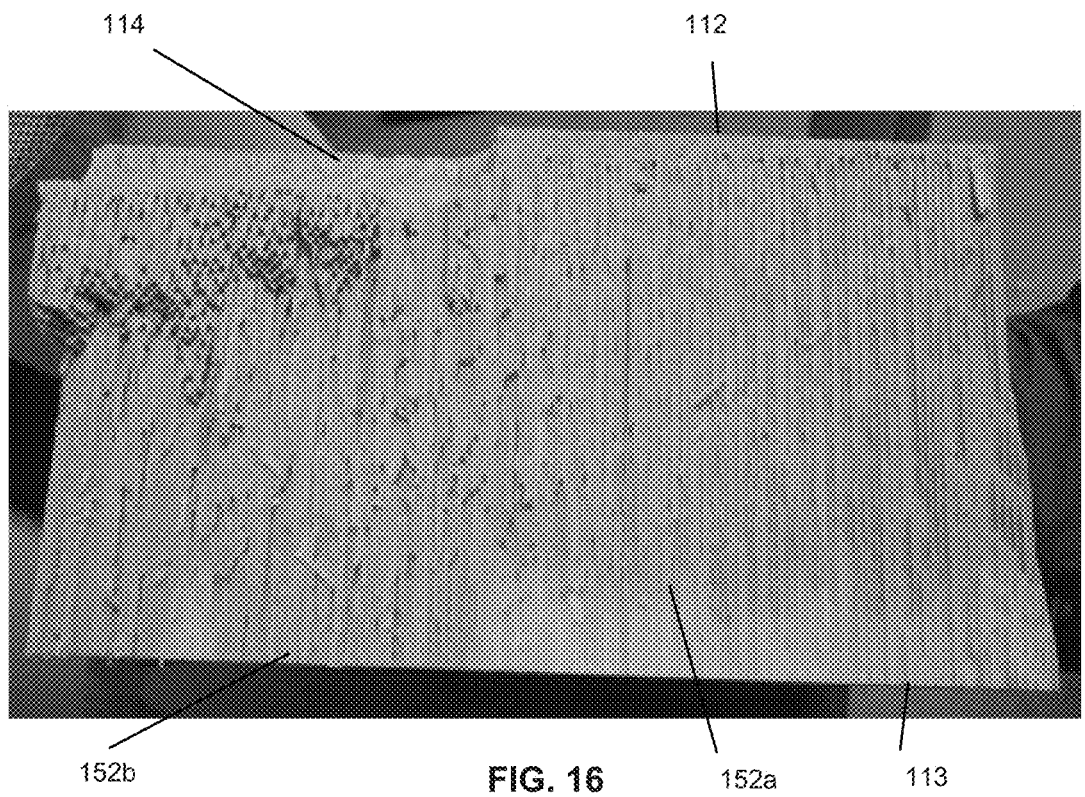
FIG. 16 is a side view of a sectioned substrate after coating with a washcoat.
Figure 17:
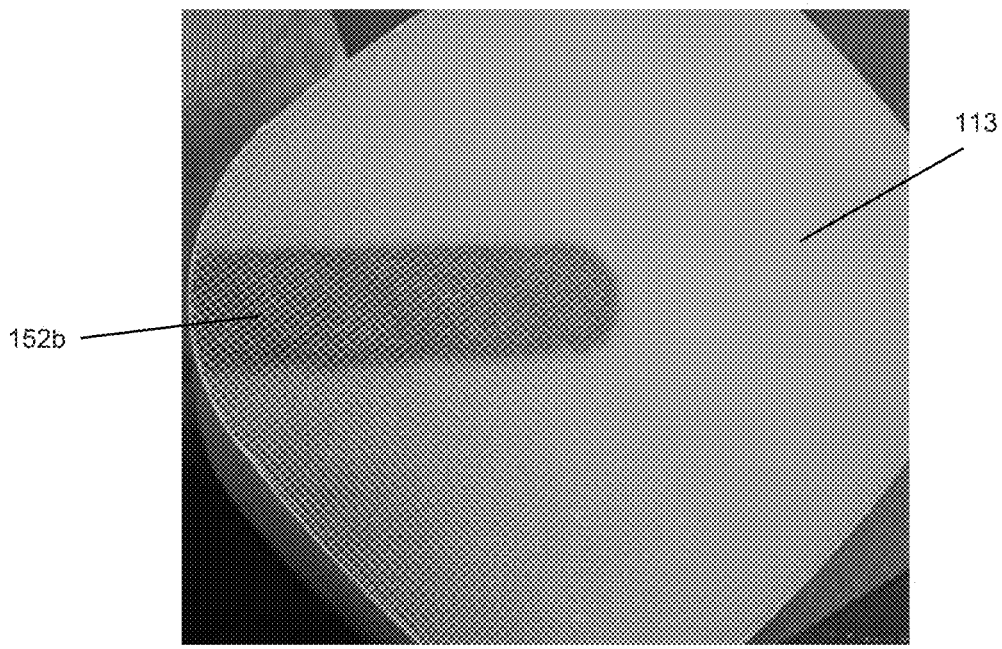
FIG. 17 is a bottom view of the substrate of FIG. 16 prior to sectioning.

FIGS. 16 and 17 show, respectively, a side view of a sectioned substrate 110 after coating with a washcoat and a bottom view of the substrate 110 after coating but before sectioning. The washcoat was applied using a substrate coating apparatus 1 of the type shown in FIGS. 1 and 2, i.e. without use of the headset seal 115 or the partition 200 according to the present disclosure. As can be seen in FIG. 16, the washcoat profile produced is very uneven, with a first portion 152a of the profile which is higher up the substrate 110 than a second portion 152b. Indeed, in this example the washcoat in the second portion 152b of the profile has reached all of the way to the lower surface 113 of the substrate 110 resulting in 'pull-through' of the washcoat. This is also visible in FIG. 17, where the region of 'pull-through' is shown by the darker patch. It will be noted that the second portion 152b of the washcoat profile is aligned with the groove 114, i.e. the washcoat has 'pulled-through' the passages directly underneath the groove 114. This can result in wastage of washcoat and also potential blocking of the passage openings on the lower surface 113 of the substrate 110.

A comparative example to those of FIGS. 14 to 17 was carried out, wherein the washcoat was applied using a substrate coating apparatus 100 of the present disclosure comprising the headset seal 115 and the partition 200. The substrate was sectioned after coating with the washcoat and a side view and an end view were analysed. It was found that using the substrate coating apparatus 100 of the present disclosure comprising the headset seal 115 and the partition 200 produced a washcoat profile that was substantially more even than that shown in FIG. 16 and 'pull-through' of the washcoat, of the type shown in FIG. 17, was entirely prevented. In particular, use of the substrate coating apparatus 100 of the present disclosure enabled an average coat depth across the profile to be obtained that met a predetermined coat depth requirement. There was also no hold up of washcoat in the groove of the substrate, of the type shown in FIG. 15, and the channels of the substrate were not blocked with washcoat. There was also no or no significant amount of washcoat on the side of the substrate, unlike in the example shown in FIG. 14.

Further aspects and embodiments of the present disclosure are set out in the following clauses:

Clause A1. A method of coating a substrate with a washcoat, wherein the method comprises the steps of:
- engaging the substrate with a headset of a substrate coating apparatus so as to locate an upper surface of the substrate below a washcoat showerhead of the substrate coating apparatus;
- arranging a partition between the washcoat showerhead and the upper surface of the substrate, the partition comprising a plurality of holes and being located in the headset to maintain a first gap between a lower face of the partition and the upper surface of the substrate;
- discharging a washcoat out of the washcoat showerhead onto an upper face of the partition; and
- passing the washcoat through the holes in the partition, onto the upper surface of the substrate and into the substrate, at least in part by applying a suction force to a lower surface of the substrate.

Clause A2. The method of clause A1, wherein the partition is arranged in a fixed relationship in the headset.

Clause A3. The method of clause A1 or clause A2, wherein the first gap is between 2 and 7 mm, optionally 5 mm.

Clause A4. The method of any preceding clause, wherein the partition is disc-shaped and has a thickness between its upper face and its lower face of between 5 and 15 mm, optionally between 7.5 and 12.5 mm, optionally 10 mm.

Clause A5. The method of any preceding clause, wherein the partition is located in the headset to maintain a second gap between a lower face of the washcoat showerhead and the upper face of the partition of between 80 and 130 mm.

Clause A6. The method of any preceding clause, wherein the partition comprises greater than 500 holes, optionally greater than 1000 holes, optionally greater than 1500 holes, optionally greater than 2000 holes.

Clause A7. The method of any preceding clause, wherein the holes are each between 1 to 3 mm in diameter, optionally 2 mm in diameter.

Clause A8. The method of any preceding clause, wherein the percentage open area of the partition, defined as the percentage of the total area of the upper face of the partition that is comprised by the holes, is between 35 and 55%, optionally between 40 and 50%, optionally about 45%.

Clause A9. The method of any preceding clause, wherein the headset further comprises a headset seal and the partition is arranged in the headset above the headset seal.

Clause A10. The method of any preceding clause, wherein the upper surface of the substrate is non-planar.

Clause A11. The method of any preceding clause, wherein the upper surface of the substrate comprises a shaping, for example a groove or cut-out, which extends to the sidewall of the substrate thereby defining a gap in the sidewall.

Clause A12. The method of any preceding clause, wherein the substrate is selected from a flow-through substrate (e.g. a monolithic flow-through substrate) or a filter substrate (e.g. a wall-flow filter substrate).

Clause A13. The method of any preceding clause, wherein the washcoat comprises a catalytic coating selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

Clause A14. The method of any preceding clause, wherein the washcoat has a viscosity of 3 to 9000 cP, optionally 3 to 54 cP, optionally 32 to 576 cP, optionally 23 to 422 cP, optionally 250 to 4500 cP, optionally 500 to 9000 cP.

Clause A15. The method of any preceding clause further comprising the steps of any one of clauses B1 to B14.

Clause A16. A substrate coating apparatus comprising:
a source of a washcoat;
a washcoat showerhead for discharging the washcoat towards an upper surface of a substrate;
a conduit fluidly connecting the source of the washcoat to the washcoat showerhead for supplying washcoat to the washcoat showerhead;
a headset for engaging the substrate to locate the upper surface of the substrate below the washcoat showerhead; and
a vacuum generator for drawing the washcoat discharged from the washcoat showerhead through the substrate;
wherein the headset comprises a partition comprising a plurality of holes, the partition being located in between the washcoat showerhead and the upper surface of the substrate when the substrate is engaged in the headset so as to maintain a first gap between a lower face of the partition and the upper surface of the substrate.

Clause A17. A substrate coating apparatus according to clause A16, wherein the partition is fixedly located in the headset so as to be held stationary relative to a housing of the headset.

Clause A18. A substrate coating apparatus according to clause A16 or clause A17, wherein the first gap is between 2 and 7 mm, optionally 5 mm.

Clause A19. A substrate coating apparatus according to any one of clauses A16 to A18, wherein the partition is disc-shaped and has a thickness between its upper face and its lower face of between 5 and 15 mm, optionally between 7.5 and 12.5 mm, optionally 10 mm.

Clause A20. A substrate coating apparatus according to any one of clauses A16 to A19, wherein the partition is located in the headset to maintain a second gap between a lower face of the washcoat showerhead and the upper face of the partition of between 80 and 130 mm.

Clause A21. A substrate coating apparatus according to any one of clauses A16 to A20, wherein the partition comprises greater than 500 holes, optionally greater than 1000 holes, optionally greater than 1500 holes, optionally greater than 2000 holes.

Clause A22. A substrate coating apparatus according to any one of clauses A16 to A21, wherein the holes are each between 1 to 3 mm in diameter, optionally 2 mm in diameter.

Clause A23. A substrate coating apparatus according to any one of clauses A16 to A22, wherein the percentage open area of the partition, defined as the percentage of the total area of the upper face of the partition that is comprised by the holes, is between 35 and 55%, optionally between 40 and 50%, optionally about 45%.

Clause A24. A substrate coating apparatus according to any one of clauses A16 to A23, wherein the headset further comprises a headset seal and the partition is arranged in the headset above the headset seal.

Clause A25. A substrate coating apparatus according to any one of clauses A16 to A24 further comprising the apparatus of any one of clauses B16 to B29.

Clause A26. A substrate coating system comprising the substrate coating apparatus of any one of clauses A16 to A25 and a substrate, wherein the upper surface of the substrate is non-planar; and optionally wherein the upper surface of the substrate comprises a shaping, for example a groove or cut-out, which extends to the sidewall of the substrate thereby defining a gap in the sidewall.

Clause A27. A substrate coating system according to clause A26 further comprising the features of clause B31 or B32.

Clause A28. A partition configured for use in a substrate coating apparatus, the partition comprising a disc-shaped body;
the disc-shaped body having a thickness between its upper face and its lower face of between 5 and 15 mm, optionally between 7.5 and 12.5 mm, optionally 10 mm;
the partition comprising greater than 500 holes, optionally greater than 1000 holes, optionally greater than 1500 holes, optionally greater than 2000 holes;
the holes each being between 1 to 3 mm in diameter, optionally 2 mm in diameter;
wherein the percentage open area of the partition, defined as the percentage of the total area of the upper face of the partition that is comprised by the holes, is between 35 and 55%, optionally between 40 and 50%, optionally about 45%.

Clause B1. A method of coating a substrate with a washcoat, wherein the method comprises the steps of:
engaging the substrate with a headset of a substrate coating apparatus so as to locate an upper surface of the substrate below a washcoat showerhead of the substrate coating apparatus;
discharging a washcoat out of the washcoat showerhead towards the upper surface of the substrate;
drawing the washcoat through the substrate by applying a suction force to a lower surface of the substrate;

wherein the step of engaging the substrate with the headset comprises engaging a headset seal of the headset with the substrate, the headset seal comprising a perimetral portion extending around the headset and a cantilevered portion extending down from the perimetral portion which engages against a sidewall of the substrate.

Clause B2. The method of clause B1, wherein the perimetral portion comprises an annular portion, optionally a circular or oval portion, that extends fully around the headset.

Clause B3. The method of clause B1 or clause B2, wherein the upper surface of the substrate is non-planar.

Clause B4. The method of any one of clauses B1 to B3, wherein the cantilevered portion is arc-shaped.

Clause B5. The method of any one of clauses B1 to B4, wherein the upper surface of the substrate comprises a shaping, for example a groove or cut-out, which extends to the sidewall of the substrate thereby defining a gap in the sidewall, wherein the cantilevered portion bridges over the gap to hinder leakage of the washcoat out of the gap and down the sidewall of the substrate.

Clause B6. The method of clause B5, wherein the cantilevered portion has an arc length of between 105 and 300% of an arc length of the gap in the sidewall, optionally between 105 and 200% of an arc length of the gap in the sidewall.

Clause B7. The method of any one of clauses B1 to B6, wherein the cantilevered portion subtends a central angle of between 45 and 120°, optionally between 45 and 90°, optionally between 65 and 75°.

Clause B8. The method of any one of clauses B1 to B7, wherein the cantilevered portion extends at an angle of between 0 and 15° with respect to a plane perpendicular to the perimetral portion; optionally at an angle of between 0 and 10° with respect to a plane perpendicular to the perimetral portion; optionally at an angle of about 3° with respect to a plane perpendicular to the perimetral portion.

Clause B9. The method of any one of clauses B1 to B8, wherein on engaging the substrate with the headset, the cantilevered portion of the headset seal flexes in a substantially radial direction.

Clause B10. The method of any one of clauses B1 to B9, wherein a lower edge of the cantilevered portion freely projects and is thus enabled to flex in a substantially radial direction.

Clause B11. The method of any one of clauses B1 to B10, wherein the cantilevered portion engages a region of the sidewall of the substrate having a height of at least 5 mm greater than a depth of a gap in the sidewall of the substrate.

Clause B12. The method of any one of clauses B1 to B11, wherein the cantilevered portion extends down at least 20 mm below a lower face of the perimetral portion, optionally at least 30 mm below a lower face of the perimetral portion, optionally at least 40 mm below a face rim of the perimetral portion.

Clause B13. The method of any one of clauses B1 to B12, wherein the substrate is selected from a flow-through substrate (e.g. a monolithic flow-through substrate) or a filter substrate (e.g. a wall-flow filter substrate).

Clause B14. The method of any one of clauses B1 to B13, wherein the washcoat comprises a catalytic coating selected from a three way catalyst (TWC), a selective catalytic reduction (SCR) catalyst, a diesel oxidation catalyst (DOC), a lean NOx trap catalyst (LNT), an ammonia slip catalyst (ASC), a combined selective catalytic reduction catalyst and ammonia slip catalyst (SCR/ASC), and a passive NOx adsorber (PNA).

Clause B15. The method of any one of clauses B1 to B14, further comprising the steps of any one of clauses A1 to A14.

Clause B16. A substrate coating apparatus comprising:
a source of a washcoat;
a washcoat showerhead for discharging the washcoat towards an upper surface of a substrate;
a conduit fluidly connecting the source of the washcoat to the washcoat showerhead for supplying washcoat to the washcoat showerhead;
a headset for engaging the substrate to locate the upper surface of the substrate below the washcoat showerhead; and
a vacuum generator for drawing the washcoat discharged from the washcoat showerhead through the substrate;
wherein the headset comprises a headset seal for engaging against the substrate, the headset seal comprising a perimetral portion that extends around the headset and a cantilevered portion that extends down from the perimetral portion and which is configured to engage against a sidewall of the substrate.

Clause B17. A substrate coating apparatus according to clause B16, wherein the perimetral portion comprises an annular portion, optionally a circular or oval portion, that extends fully around the headset.

Clause B18. A substrate coating apparatus according to clause B16 or clause B17, wherein the cantilevered portion engages a region of the sidewall of the substrate having a height of at least 5 mm greater than a depth of a gap in the sidewall of the substrate.

Clause B19. A substrate coating apparatus according to any one of clauses B16 to B18, wherein the cantilevered portion extends down at least 20 mm below a lower face of the perimetral portion, optionally at least 30 mm below a lower face of the perimetral portion, optionally at least 40 mm below a face rim of the perimetral portion.

Clause B20. A substrate coating apparatus according to any one of clauses B16 to B19, wherein the cantilevered portion extends at an angle of between 0 and 15° with respect to a plane perpendicular to the perimetral portion; optionally at an angle of between 0 and 10° with respect to a plane perpendicular to the perimetral portion; optionally at an angle of about 3° with respect to a plane perpendicular to the perimetral portion.

Clause B21. A substrate coating apparatus according to any one of clauses B16 to B20, wherein the headset comprises a rigid headset frame supporting the perimetral portion of the headset seal and the cantilevered portion of the headset seal extends below a lower face of the rigid headset frame.

Clause B22. A substrate coating apparatus according to any one of clauses B16 to B21, wherein a lower edge of the cantilevered portion freely projects from the rigid headset frame.

Clause B23. A substrate coating apparatus according to any one of clauses B16 to B22, wherein the cantilevered portion is arc-shaped.

Clause B24. A substrate coating apparatus according to any one of clauses B16 to B23, wherein the cantilevered portion subtends a central angle of between 45 and 120°, optionally between 45 and 90°, optionally between 65 and 75°.

Clause B25. A substrate coating apparatus according to any one of clauses B16 to B24, wherein the cantilevered portion has a depth, in a radial direction, of between 2.5 to 5.0 mm.

Clause B26. A substrate coating apparatus according to any one of clauses B16 to B25, wherein the perimetral portion and the cantilevered portion are formed unitarily.

Clause B27. A substrate coating apparatus according to any one of clauses B15 to B24, wherein the perimetral portion and the cantilevered portion are separate.

Clause B28. A substrate coating apparatus according to any one of clauses B16 to B27, wherein the perimetral portion and the cantilevered portion are formed of different materials.

Clause B29. A substrate coating apparatus according to any one of clauses B16 to B28, wherein the cantilevered portion has a shore hardness of between 35 A and 45 A, optionally of 40 A.

Clause B30. A substrate coating apparatus according to any one of clauses B16 to B29 further comprising the apparatus of any one of clauses A16 to A24.

Clause B31. A substrate coating system comprising the substrate coating apparatus of any one of clauses B16 to B30 and a substrate, wherein the upper surface of the substrate is non-planar.

Clause B32. A substrate coating system according to clause B31, wherein the upper surface of the substrate comprises a shaping, for example a groove or cut-out, which extends to the sidewall of the substrate thereby defining a gap in the sidewall.

Clause B33. A substrate coating system according to clause B31 or B32 further comprising the features of clause A26 or A27.

Clause B34. A headset seal for engaging against a substrate, the headset seal comprising a perimetral portion for extending around a headset and a cantilevered portion that extends from the perimetral portion and which is configured for engaging against a sidewall of a substrate.

Clause B35. A headset seal according to clause B34, wherein the cantilevered portion is arc-shaped.

Clause B36. A headset seal according to clause B34 or clause B35, wherein the cantilevered portion subtends a central angle of between 45 and 120°, optionally between 45 and 90°, optionally between 65 and 75°.

Clause B37. A headset seal according to any one of clauses B34 to B36, wherein the cantilevered portion has a depth, in a radial direction, of between 2.5 to 5.0 mm.

Clause B38. A headset seal according to any one of clauses B34 to B37, wherein the perimetral portion and the cantilevered portion are formed unitarily.

Clause B39. A headset seal according to any one of clauses B34 to B37, wherein the perimetral portion and the cantilevered portion are separate.

Clause B40. A headset seal according to any one of clauses B34 to B39, wherein the perimetral portion and the cantilevered portion are formed of different materials.

Clause B41. A headset seal according to any one of clauses B34 to B40, wherein the cantilevered portion has a shore hardness of between 35 A and 45 A, optionally of 40 A.

The invention claimed is:

1. A substrate coating apparatus comprising:
    a source of a washcoat;
    a washcoat showerhead for discharging the washcoat towards an upper surface of a substrate;
    a conduit fluidly connecting the source of the washcoat to the washcoat showerhead for supplying washcoat to the washcoat showerhead;
    a headset for engaging the substrate to locate the upper surface of the substrate below the washcoat showerhead; and
    a vacuum generator for drawing the washcoat discharged from the washcoat showerhead through the substrate;
    wherein the headset comprises a partition comprising a plurality of holes, the partition being located in between the washcoat showerhead and the upper surface of the substrate when the substrate is engaged in the headset so as to maintain a first gap between a lower face of the partition and the upper surface of the substrate.

2. The substrate coating apparatus according to claim 1, wherein the partition is fixedly located in the headset so as to be held stationary relative to a housing of the headset.

3. The substrate coating apparatus according to claim 1, wherein the first gap is between 2 and 7 mm.

4. The substrate coating apparatus according to claim 1, wherein the percentage open area of the partition, defined as the percentage of the total area of the upper face of the partition that is comprised by the holes, is between 35 and 55%.

5. The substrate coating apparatus according to claim 1, wherein the percentage open area of the partition, defined as the percentage of the total area of the upper face of the partition that is comprised by the holes, is between 40 and 50%.

6. The substrate coating apparatus according to claim 1, wherein the headset further comprises a headset seal and the partition is arranged in the headset above the headset seal.

7. A substrate coating system comprising the substrate coating apparatus of claim 1 and a substrate, wherein the upper surface of the substrate is non-planar; and wherein the upper surface of the substrate comprises a groove or cut-out, which extends to the sidewall of the substrate thereby defining a gap in the sidewall.

* * * * *